US012798292B2

(12) United States Patent
Lee

(10) Patent No.: US 12,798,292 B2
(45) Date of Patent: Nov. 17, 2026

(54) HUB FOR A BICYCLE

(71) Applicant: GLORY WHEEL ENTERPRISE CO., LTD., Taichung City (TW)

(72) Inventor: Chien-Hao Lee, Taichung City (TW)

(73) Assignee: GLORY WHEEL ENTERPRISE CO., LTD., Taichung City (TW)

( * ) Notice: Subject to any disclaimer, the term of this patent is extended or adjusted under 35 U.S.C. 154(b) by 302 days.

(21) Appl. No.: 18/619,488

(22) Filed: Mar. 28, 2024

(65) Prior Publication Data

US 2025/0303791 A1 Oct. 2, 2025

(51) Int. Cl.

*B60B 27/04* (2006.01)
*B60B 27/02* (2006.01)
*F16D 41/36* (2006.01)
*B60B 27/00* (2006.01)

(52) U.S. Cl.

CPC .......... *B60B 27/047* (2013.01); *B60B 27/023* (2013.01); *F16D 41/36* (2013.01); *B60B 27/0015* (2013.01); *B60B 2200/47* (2013.01); *B60B 2380/70* (2013.01); *B60B 2900/131* (2013.01); *B60B 2900/133* (2013.01); *B60B 2900/50* (2013.01)

(58) Field of Classification Search

CPC . B60B 27/0015; B60B 27/023; B60B 27/047; B60B 27/0073; B62M 9/10; F16D 41/24; F16D 41/36

See application file for complete search history.

(56) References Cited

U.S. PATENT DOCUMENTS

2008/0006500 A1* 1/2008 Spahr .................. B60B 27/0073 192/64
2011/0148183 A1* 6/2011 Chen ..................... B60B 27/023 301/110.5
2013/0088075 A1* 4/2013 Spahr .................. B60B 27/0031 301/110.5
2015/0060224 A1 3/2015 Lee
2024/0017569 A1 1/2024 Chen

FOREIGN PATENT DOCUMENTS

CN 206155022 U * 5/2017
CN 217671977 U * 10/2022
FR 3034153 A1 * 9/2016 ........... B60B 27/047
TW I638729 B * 10/2018

* cited by examiner

*Primary Examiner* — Kip T Kotter

(74) *Attorney, Agent, or Firm* — Muncy, Geissler, Olds & Lowe, P.C.

(57) ABSTRACT

A hub for a bicycle has a body (10) which is hollow and tubular, an inner gear (14) which is formed on an inner surface at an end of the body (10). A gear set (20) is engaged with the inner gear (14), and a wheel base (30) is rotatably engaged with the gear set (20) unidirectionally. Two shock-absorbing gaskets (40) are attached respectively to two sides of the gear set (20).

4 Claims, 3 Drawing Sheets

HUB FOR A BICYCLE

The present invention relates to a bicycle hub, especially to a bicycle hub with shock-absorbing and noise-reducing effects.

Using an axle to penetrate and connect a bicycle hub on a bicycle is a conventional way to make a bicycle wheel rotate around the axle. A conventional hub mainly includes a body, multiple bearings, a gear set and a wheel base. The body is mounted around the axle, the multiple bearings and the gear set are arranged in the body to allow the body to be rotated relative to the axle. The wheel base is also mounted around the axle and is connected to a flywheel/sprocket set of the bicycle. An annular gear engaged with the gear set unidirectionally is mounted in the wheel base. Thus, when a rider stepping the pedals of the bicycle to move forward, the flywheel/sprocket set may drive the wheel base to rotate, and the body is driven to rotate through the unidirectional engagement between the annular gear and the gear set. Accordingly, the bicycle wheel may be rotate around the axle. If the rider reverses a stepping direction of the pedals, an idling may be formed between the annular gear and the gear set.

In order to make a rotation between the annular gear and the gear set smoother, lubricating oil is usually applied between the gear set and the annular gear. However, after a period of riding, the lubricating oil will gradually drain away and the lubrication will be lost, and vibration and noise are generated between the gear set and the annular gear, which are made of metal. The vibration will be transmitted to the bicycle frame or even the handlebars through the body, the wheel base or other structures of the bicycle to affect the smoothness of riding.

in order to prevent the vibration be transmitted to the bicycle frame or even the handlebars and avoid the noise be generated during bicycle riding. the present invention provides a hub for a bicycle, comprising a body which is hollow and tubular, an inner gear which is formed on an inner surface at an end of the body. A gear set is engaged with the inner gear, and a wheel base is rotatably engaged with the gear set unidirectionally. Two shock-absorbing gaskets are attached respectively to two sides of the gear set.

Wherein, two receiving grooves for receiving the shock-absorbing gaskets are respectively arranged on two sides of the gear set.

Wherein, two ends of the body respectively form an annular plate which is applied to integrate with the spokes of the wheel.

Wherein, plurality of bearings is arranged in the body.

Wherein, two bearings are respectively arranged at two ends of the body.

Wherein, two wheel bearings are placed and spaced apart from each other in the wheel base and a spacer is provided in the wheel base and located between the two wheel bearings.

Wherein, a shock-absorbing ring is sleeved on the spacer, and an outer surface of the shock-absorbing ring abuts the wheel base.

Due to the position of two shock-absorbing gaskets and the shock-absorbing ring. When a lubricating oil filled is lost due to long-term riding, the shock-absorbing gasket and the shock-absorbing ring can absorb the vibration generated by gear engaging or gear skipping between the gear set and the annular gear, and can present the shock-absorbing and noise-preventing effects, which can improve the smoothness when bicycle riding.

IN THE DRAWINGS

Figure 1:
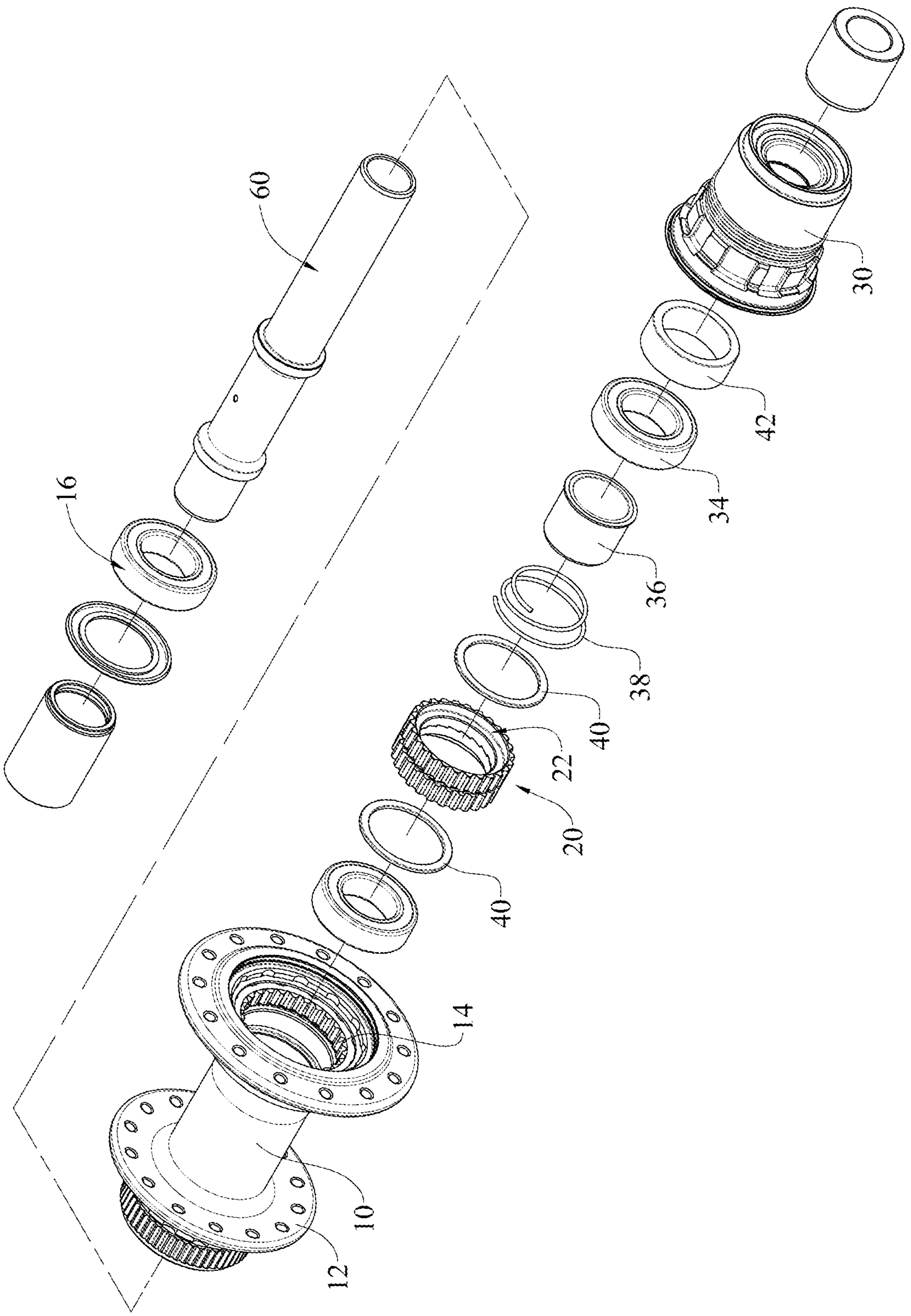
FIG. 1 is an exploded perspective view of a hub in accordance with the present invention.
Figure 2:
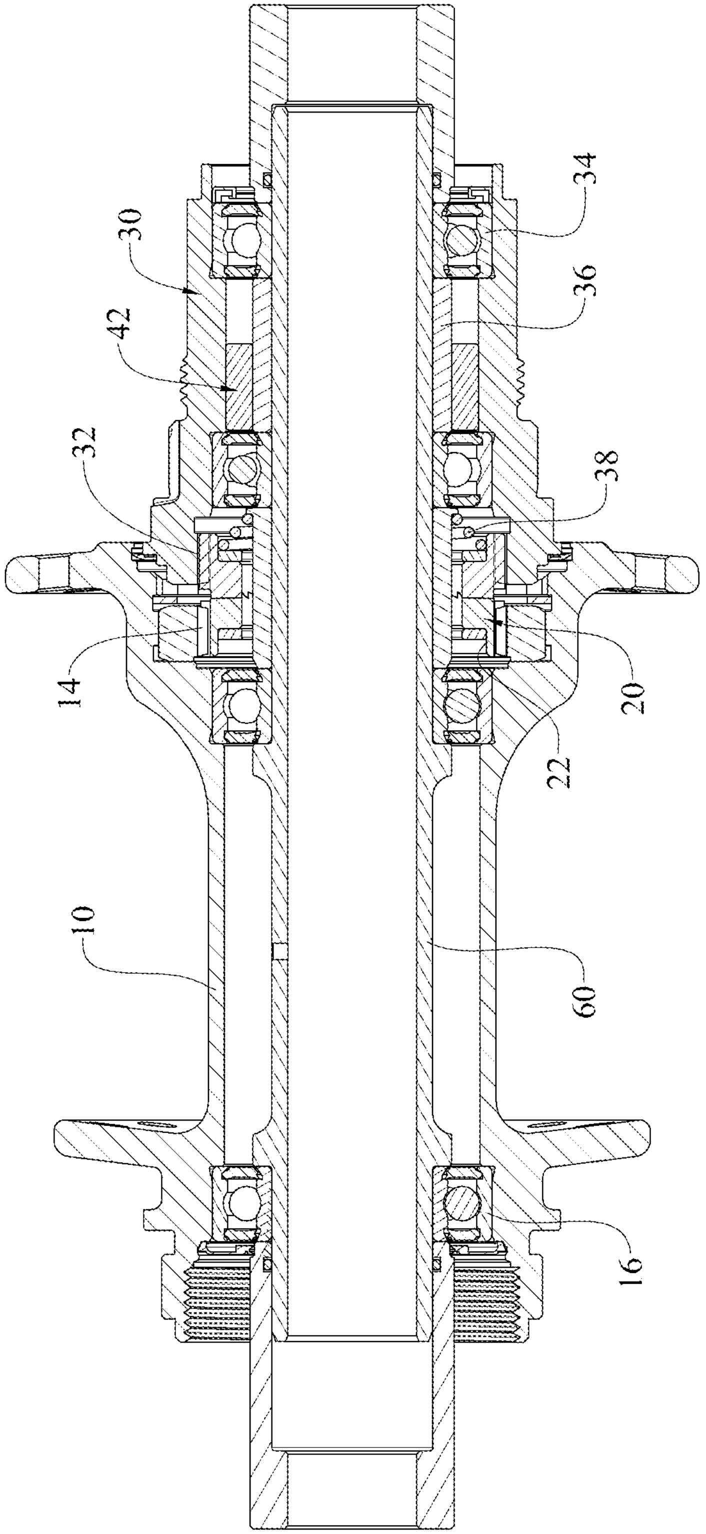
FIG. 2 is a cross sectional side view of the hub in FIG. 1.
Figure 3:
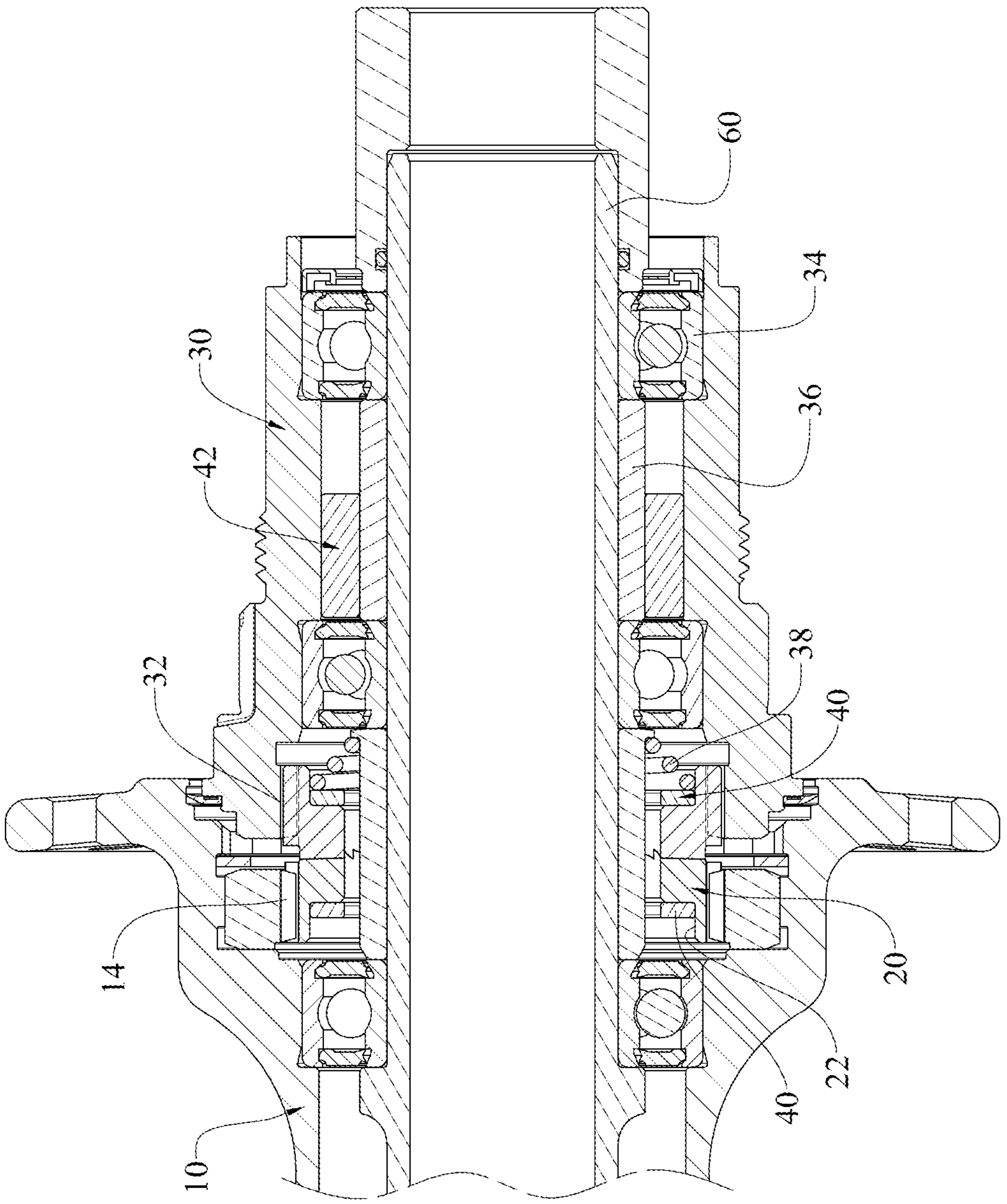
FIG. 3 is an enlarged cross section side view of the hub in FIG. 1.

In order to make purposes, technical solutions, and advantages of the present invention to be clearer, the following content provides some preferred embodiments in accordance with the present invention. With reference to FIG. 1 to FIG. 3, a hub of a bicycle in accordance with the present invention is rotatably mounted around an axle 60, and is connected to a bicycle wheel. The hub comprises a body 10, a gear set 20 and a wheel base 30. The body 10 is hollow and tubular, and two annular plates 12 are formed respectively on positions near two ends of the body and are connected with the spokes of a wheel of the bicycle. An inner gear 14 is provided on an inner surface at one of the ends of the body 10, and multiple bearings 16 are arranged in the body 10 to allow the body to be rotated relative to the axle 60. Preferably, two bearings 16 are respectively arranged at two ends of the body 10.

The gear set 20 is held in one of ends of the body 10 and is engaged with the inner gear 14 in the body 10. The wheel base 30 is rotatably connected with the body 10 at the end corresponding to the gear set 20, and is connected to a flywheel/sprocket set of the bicycle. An annular gear 32 is formed in the wheel base 30 and is engaged with the gear set 20 unidirectionally. Two wheel bearings 34 are placed and spaced apart from each other in the wheel base 30, and the two wheel bearings 34 are also mounted around the axle 60. In addition, a spacer 36 is provided in the wheel base 30, is mounted around the axle 60, and is located between the two wheel bearings 34. Two ends of the spacer 36 respectively abut against the two wheel bearings 34. An elastic member 38 abuts against one side of the gear set 20. The elastic member 38 can be a spring, and the other end of the elastic member 38 can abut against one of the wheel bearings 34.

The hub in accordance with this invention also has two shock-absorbing gaskets 40 which are attached respectively to two sides of the gear set 20. Each shock-absorbing gasket 40 is made of soft material such as rubber. In addition, two grooves 22 for receiving the shock-absorbing gasket 40 respectively are defined in two sides of the gear set 20. A shock-absorbing ring 42 is mounted around the spacer 36 of the wheel base 30, and the outer surface of the shock-absorbing ring 42 abuts the wheel base 30.

Thus, when a rider steps on the pedals of the bicycle to move forward, the flywheel/sprocket set may drive the wheel base 30 to rotate, and the body 10 is driven to rotate through a unidirectional engagement between the annular gear 32 and the gear set 20. Accordingly, the bicycle wheel may rotate around the axle 60. If the rider reverses a stepping direction of the pedals, a gear skipping may be formed between the annular gear 32 and the gear set 20, and the body 10 and the wheel remain in an idling state.

With such arrangement, the two shock-absorbing gaskets 40 are attached respectively to two sides of the gear set 20. If a lubricating oil filled in the gear set 20, the annular gear 32 or inner gear 14 is lost due to long-term riding, the bicycle can use the soft shock-absorbing gasket 40 to absorb the vibration generated by gear engaging or gear skipping between the gear set 20 and the annular gear 32. Therefore, the hub in accordance with the present invention not only can prevent the vibration from being transmitted to the body

10 and the bicycle frame, but also can prevent noise from being generated to improve the smoothness during bicycle riding.

Secondly, the shock-absorbing ring 42 provided on the spacer 36 of the wheel base 30 also can provide the shock-absorbing and noise-preventing effects to improve the smoothness during bicycle riding.

The invention claimed is:

1. A hub of a bicycle, comprising:

a body (10) which is hollow and tubular, wherein an inner gear (14) is provided on an inner surface at an end of the body (10);

a gear set (20) held in the end of the body (10) and engaged with the inner gear (14), wherein two receiving grooves (22) are respectively defined in two sides of the gear set (20);

a wheel base (30) rotatably connected with the end of the body (10) corresponding to the gear set (20), an annular gear (32) being formed in the wheel base (30) and engaged with the gear set (20) unidirectionally;

two shock-absorbing gaskets (40) respectively placed in the two receiving grooves (22);

an elastic member (38), wherein an end portion of the elastic member is received in one of the two receiving grooves, and the end portion of the elastic member abuts against one of the two shock-absorbing gaskets;

two wheel bearings (34) placed in the wheel base (30);

a spacer (36) provided in the wheel base (30) and located between the two wheel bearings (34); and a shock-absorbing ring (42) disposed around the spacer (36) and abutting against the wheel base (30).

2. The hub as claimed in claim 1, further comprising two annular plates (12) provided respectively on positions near two ends of the body (10).

3. The hub as claimed in claim 1, further comprising two bearings (16) respectively arranged at two ends of the body (10).

4. The hub as claimed in claim 1, further comprising multiple bearings (16) arranged in the body.

* * * * *